(12) United States Patent
Wells, Jr.

(10) Patent No.: US 12,502,754 B2
(45) Date of Patent: Dec. 23, 2025

(54) GEARLESS RATCHETING BINDER

(71) Applicant: Columbus McKinnon Corporation, Getzville, NY (US)

(72) Inventor: William P. Wells, Jr., Ider, AL (US)

(73) Assignee: Columbus McKinnon Corporation, Getzville, NY (US)

( * ) Notice: Subject to any disclaimer, the term of this patent is extended or adjusted under 35 U.S.C. 154(b) by 349 days.

(21) Appl. No.: 18/201,659

(22) Filed: May 24, 2023

(65) Prior Publication Data

US 2024/0391071 A1   Nov. 28, 2024

(51) Int. Cl.
*B25B 25/00* (2006.01)
(52) U.S. Cl.
CPC .................................. *B25B 25/00* (2013.01)
(58) Field of Classification Search
CPC .......... B60P 7/083; F16G 11/12; B25B 25/00; B21F 9/00; B21F 9/02
See application file for complete search history.

(56) References Cited

U.S. PATENT DOCUMENTS

| | | | | |
|---|---|---|---|---|
| 2,403,512 | A | | 7/1946 | Flesch |
| 2,860,898 | A | * | 11/1958 | Dooley, Jr. ............. F16G 11/12 403/80 |
| 2,946,563 | A | | 7/1960 | Eaton |
| 3,220,717 | A | * | 11/1965 | Altherr ................... F16G 11/12 267/70 |
| 3,357,664 | A | * | 12/1967 | Geyer .................. F16L 3/1091 248/65 |
| 3,856,253 | A | * | 12/1974 | Seebinger .............. F16M 11/28 403/104 |
| 5,217,208 | A | * | 6/1993 | Stephenson ............. F16G 11/12 242/379 |
| 5,524,505 | A | | 6/1996 | Lawrence |
| 6,048,146 | A | * | 4/2000 | Wiedmeyer ............. B60P 7/083 410/97 |
| 8,496,417 | B1 | * | 7/2013 | Yang ...................... B60P 7/083 410/51 |

(Continued)

FOREIGN PATENT DOCUMENTS

| | | |
|---|---|---|
| CN | 210337724 U | 4/2020 |
| CN | 215110313 U | 12/2021 |

(Continued)

OTHER PUBLICATIONS

Piqua Side Wheel Turnbuckle.

(Continued)

*Primary Examiner* — Emmanuel M Marcelo
(74) *Attorney, Agent, or Firm* — Phillips Lytle LLP; David L. Principe

(57) ABSTRACT

A gearless binder has a main tube with internal threads at opposed open ends. The gearless binder has a pair of semicircular threaded shafts threadably received in the opposed open ends such that, when the shafts are connected by hooks to a chain and prevented from rotation, the rotation of the tube by a gearless mechanism causes the shafts to simultaneously move inward relative to the tube increasing tension on the opposed hooks to secure a load. A spring disposed around the tube provides a gripping force on the tube to allow for rotation of the tube in a first direction to cause the threaded members to enter the tube to secure a load.

18 Claims, 5 Drawing Sheets

(56) References Cited

U.S. PATENT DOCUMENTS

| | | |
|---|---|---|
| 11,110,849 B1 | 9/2021 | Alterie |
| 2014/0326935 A1 | 11/2014 | Chao |
| 2019/0351808 A1 | 11/2019 | Liu |
| 2019/0351809 A1 | 11/2019 | Liu |
| 2022/0111782 A1 | 4/2022 | Scott |

FOREIGN PATENT DOCUMENTS

| | | | | |
|---|---|---|---|---|
| CN | 216618411 U | 5/2022 | | |
| DE | 102008011769 A1 * | 9/2009 | ............. | F16G 11/12 |
| DE | 102008025366 A1 * | 12/2009 | ............. | F16G 11/12 |
| DE | 102018117288 B3 | 7/2019 | | |
| EP | 1588975 A2 * | 10/2005 | ............... | B66B 7/08 |

OTHER PUBLICATIONS

International Lashing Systems, Chain Turnbuckle 20T, Feb. 16, 2021.

European Patent Office, European Search Report dated Nov. 7, 2024.

\* cited by examiner

GEARLESS RATCHETING BINDER

TECHNICAL FIELD

The present invention relates generally to the field of material handling, and more particularly to a mechanical device used to tighten and secure bindings such as a link chain being used to stabilize and secure heavy cargo or equipment on a cargo carrying vehicle or vessel including, but not limited to, trucks, trains, planes, and ships.

BACKGROUND ART

A standard ratchet binder includes a center tube that has internal left and right hand threads at the tube ends. A threaded shaft moves into and out of each end of the tube. The ends of the shafts are fitted with hooks that hook onto respective chain ends (not shown) for securing a load and are thereby prevented from turning. Turning of the tube is typically achieved by a ratchet mechanism having a pawl ratchet gear operated with a handle. The handle is worked back and forth to turn the tube relative to the shafts which draws the shafts into the tube and thereby achieves tightening of the chain. The ratchet mechanism can be reversed to extend the shafts from the tube for loosening of the chain binder, again by working the handle back and forth. What is needed is an improved gearless binder that provides a simpler and more flexible design.

BRIEF SUMMARY OF THE INVENTION

With parenthetical reference to the corresponding parts, portions or surfaces of the disclosed embodiment, merely for the purposes of illustration and not by way of limitation, the present invention meets the above described need by providing a gearless binder (7) having an internally threaded tube (10) having opposing, open ends (13, 16). Threaded shafts (19, 22) are threadably inserted into the opposing open ends (13, 16). The threads in the tube (10) and the threads on the shafts (19, 22) are adapted to provide common contraction and extension of the shafts (19, 22) relative to the tube (10) interior with the shafts (19, 22) not turning and the tube (10) turning.

A helical spring (70) is disposed around the outside of the tube (10). Opposite ends (76, 79) of the spring (70) are configured such that rotation of one end (79) in a first direction causes the spring (70) to tighten around the tube (10), and rotation of the other end (76) causes the spring (70) to loosen its grip on the tube (10) such that the spring (70) can be moved into a plurality of positions along the length of the tube (10).

In another aspect, the invention further comprises a handle (49) configured to rotatably engage with opposite ends (76, 79) of the spring (70) such that rotation of the handle (49) in a first direction causes the spring (70) to tighten around the tube (10) and rotation of the handle (49) in a second direction causes the spring (70) to loosen its grip on the tube (10).

In another aspect, the handle (49) has a pair of angled members (55, 58) connected to a straight portion (64).

In a further aspect, the straight portion (64) is configured to be received in a housing (52) surrounding the spring (70).

In yet another aspect, the straight portion (64) is disposed substantially perpendicular to the tube (10) when the housing (52) is mounted on the tube (10).

In another aspect, the housing (52) has a first portion (53) and a second portion (54) removably attached to the first portion (53) around the tube (10).

In a further aspect, the threaded shaft (19, 22) has an eyelet (31, 34) disposed at an end.

In yet another aspect, the spring (70) is configured such that rotation of one end (76) of the spring (70) enables the spring (70) to release from the tube (10) such that the spring (70) can be slid over the tube (10) in either direction along the length of the tube (10) without removing the housing (52).

Another aspect of the invention comprises a projection (67) extending from the straight portion (64). The projection (67) is configured such that rotation of the straight portion (64) in a first direction causes the projection (67) to engage with a first end (79) of the spring and rotation of the straight portion (64) in a second direction opposite the first direction causes the projection (67) to engage with a second end (76) of the spring (70) disposed opposite from the first end (79) of the spring (70).

In another embodiment, the invention includes an internally threaded tube (10) having opposing, open ends (13, 16). Threaded shafts (19, 22) may be threadably inserted into the opposing open ends (13, 16) and the threads in the tube (10) and on the shafts (19, 22) adapted to provide common contraction and extension of the shafts (19, 22) relative to the tube (10) interior with the shafts (19, 22) not turning and the tube (10) turning.

A helical spring (70) is disposed around the outside surface (73) of the tube (10).

A handle (49) is configured to rotatably engage with opposite ends (76, 79) of the spring (70) such that rotation of the handle (49) in a first direction causes the spring (70) to tighten around the tube (10) and rotation of the handle (49) in a second direction opposite from the first direction causes the spring (70) to loosen its grip on the tube (10) such that the spring (70) can be moved into a new location along the length of the tube (10).

A housing (52) may be mounted around the tube (10) and may enclose the spring (70) and a portion of the handle (49).

In another aspect, the handle (49) has a pair of angled members (55, 58) connected to a straight portion (64).

In another aspect the straight portion (64) is configured to be received in a housing (52) surrounding the spring (70).

In a further aspect, the straight portion (64) is disposed substantially perpendicular to the tube (10) when the housing (52) is mounted on the tube (10).

In yet another aspect, the housing (52) has a first portion (53) and a second portion (54) removably attached to the first portion (53) around the tube (10).

In another aspect, the threaded shaft (19, 22) has an eyelet (31, 34) disposed at an end.

Another aspect of the invention comprises a projection (67) extending from the straight portion (64). The projection (67) may be configured such that rotation of the straight portion (64) in a first direction causes the projection (67) to engage with a first end (79) of the spring (70) and rotation of the straight portion (64) in a second direction opposite the first direction causes the projection (67) to engage with a second end (76) of the spring (70) disposed opposite from the first end (79) of the spring (70).

In another aspect of the invention, a gearless binder (7) includes an internally threaded tube (10) having opposing, open ends (13, 16). Threaded shafts (19, 22) may be threadably inserted into the opposing open ends (13, 16) and the threads in the tube (10) and on the shafts (19, 22) may be adapted to provide common contraction and extension of the shafts (19, 22) relative to the tube (10) interior with the shafts (19, 22) not turning and the tube (10) turning.

A helical spring (70) is disposed around the outside of the tube (10). The helical spring (70) has a first end (79) and a second end (76) disposed opposite the first end (79).

The invention further includes means (58) for rotating the first end of the spring (70) in a first direction to wrap the spring (70) tighter around the tube (10) and means (55) for rotating the second end of the spring (70) in a second direction to unwrap the spring (70) from the tube (10).

DESCRIPTION OF THE PREFERRED EMBODIMENTS

Figure 1:
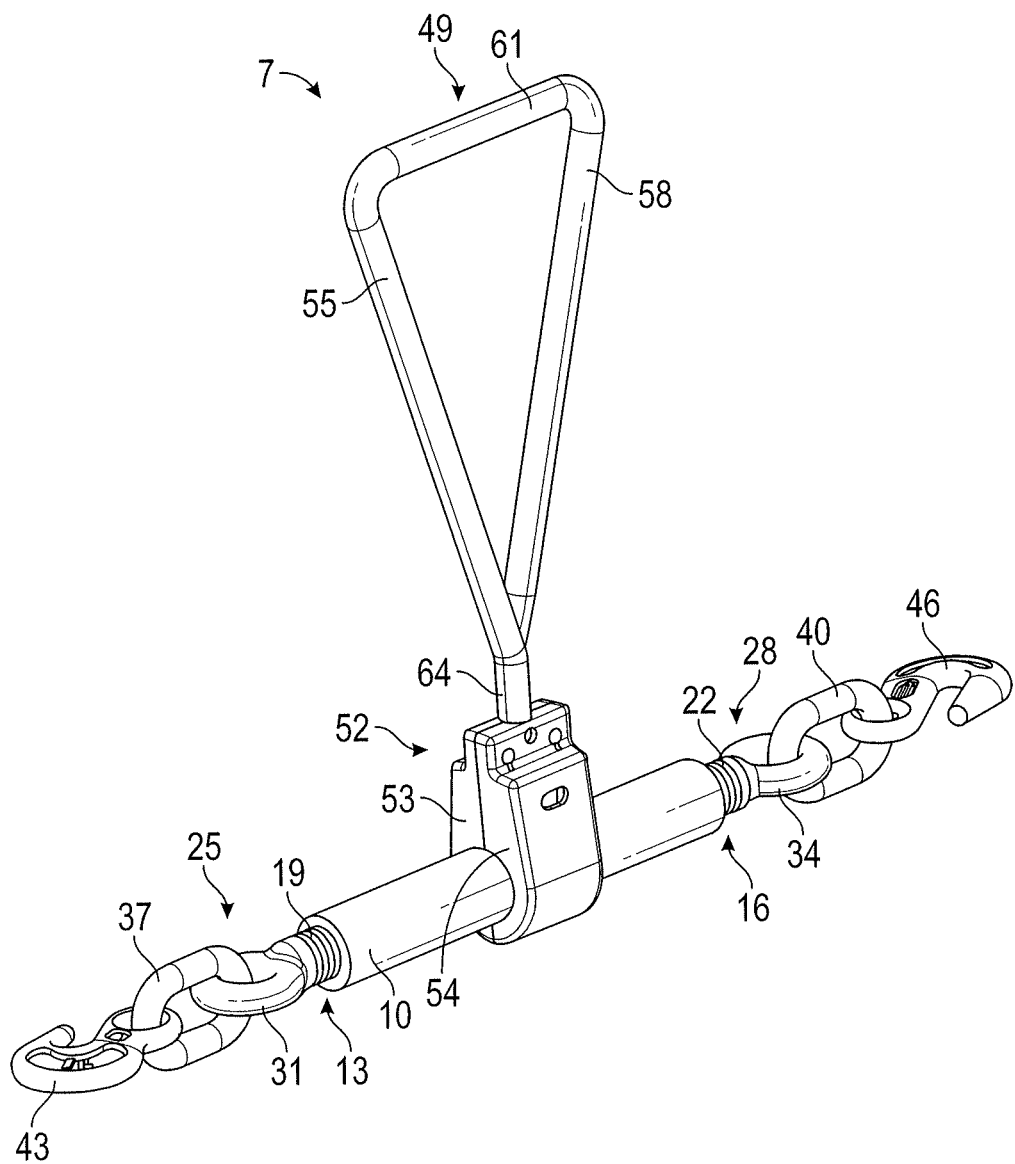
FIG. 1 is a perspective view of the gearless ratcheting binder of the present invention.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, debris, etc.) together with the specification, and are to be considered a portion of the entire written description of this invention. As used in the following description, the terms "horizontal", "vertical", "left", "right", "up" and "down", as well as adjectival and adverbial derivatives thereof, (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or of rotation, as appropriate.

Referring now to the drawings, and more particularly to FIGS. 1-4 thereof, one embodiment of the invention provides a gearless binder 7 having a center tube 10 that has internal left and right hand threads at the tube ends 13 and 16. A threaded shaft 19, 22 moves into and out of each end 13, 16 of the tube 10. The ends 25, 28 of the shafts 19, 22 may include eyelets 31, 34 that may be connected to chain links 37, 40. The chain links 37, 40 may be configured to support hook members 43, 46 that hook onto respective chain ends (not shown) for securing a load. The connection of the hook members 43, 46 to the respective chain ends prevents them from turning. Turning of the tube 10 in a first direction (with the hook members 43, 46 prevented from turning) draws the shafts 19, 22 into the tube 10 and achieves tightening of the chain. Turning of the tube 10 in the opposite direction causes the shafts 19, 22 to move away from the respective ends of the tube 10 to loosen the connection.

Toward the center of FIG. 1, a handle 49 may be configured to rotate the central tube 10 as described in greater detail herein. The handle 49 may be received in a housing 52. As shown the housing 52 may be formed by two parts 53, 54 connected around the tube 10. The handle 49 may be provided with two angled arms 55, 58 that extend to a cross bar 61 that may be located at the top of the handle 49. The arms 55, 58 provide for rotational motion of the handle 49 about a vertical axis extending longitudinally through an extended portion 64 that extends into the housing 52.

Figure 2A:
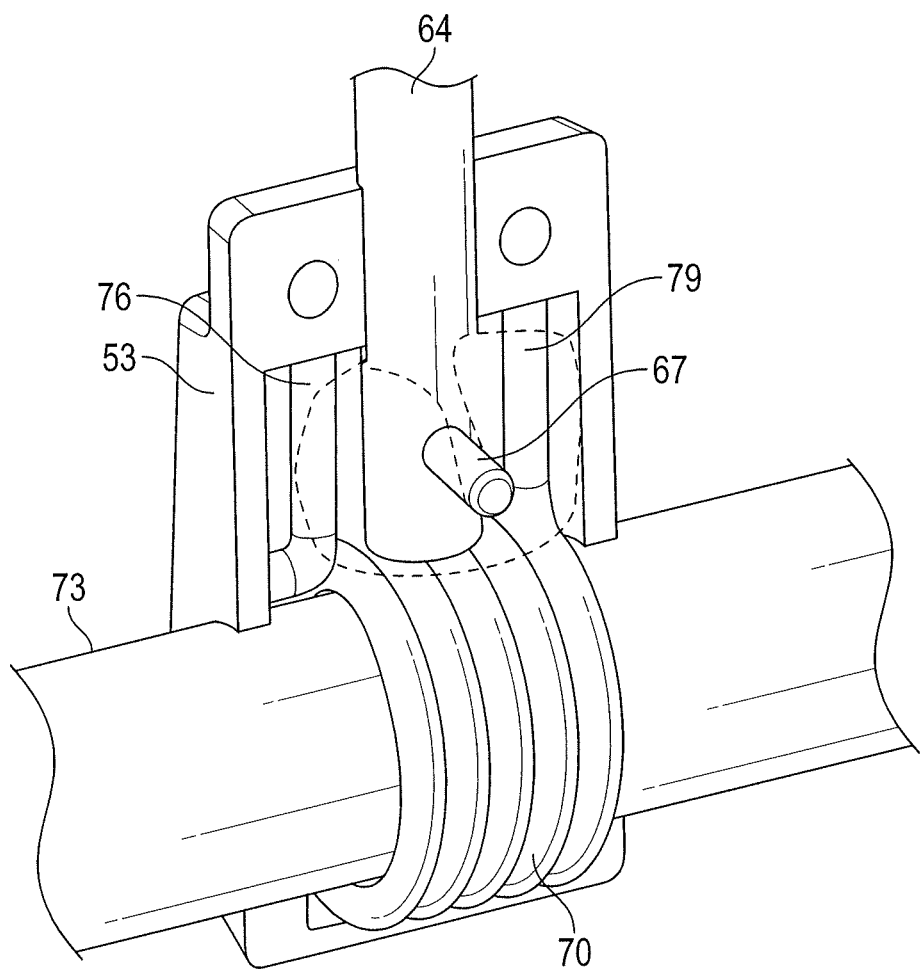
FIG. 2A is a partial cutaway perspective view of a spring mechanism of one embodiment of the present invention with a spring cam shown in broken lines for clarity

Turning to FIG. 2A, a portion of housing 52 has been removed for clarity. As shown the end of the extended portion 64 is provided with a projecting member 67 that extends substantially perpendicular to the longitudinal axis of the extended portion 64.

Figure 2B:
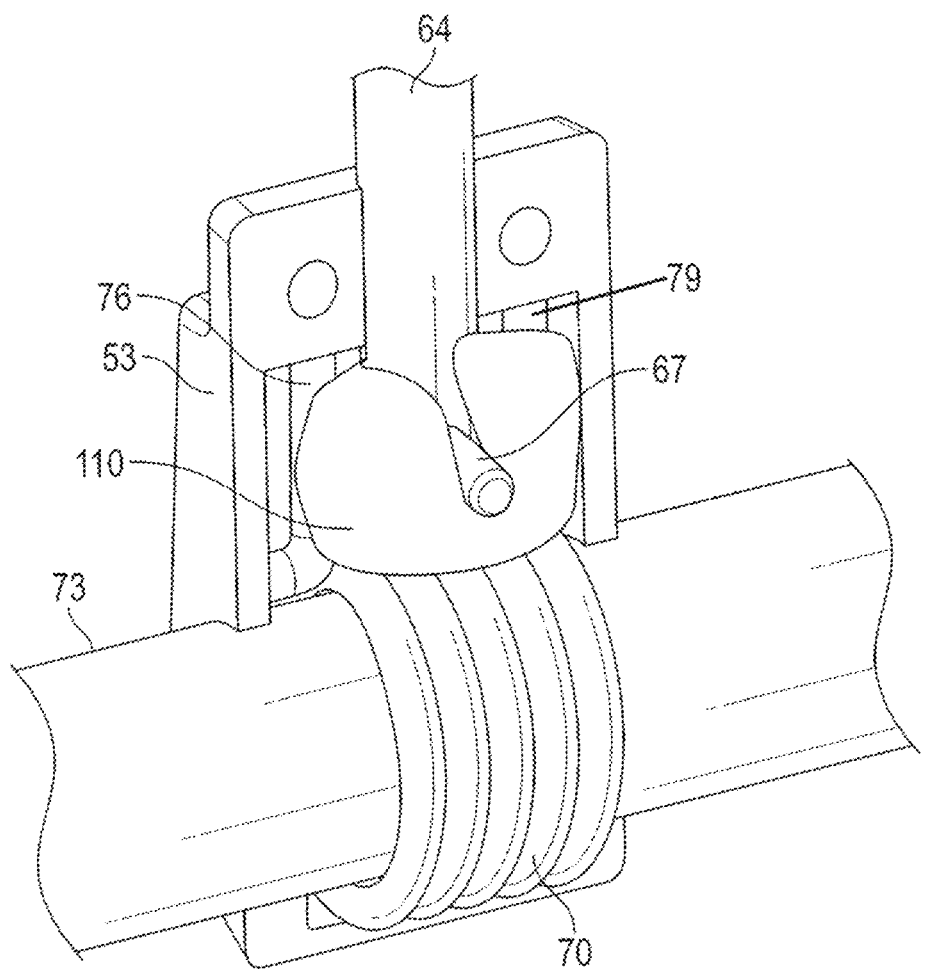
FIG. 2B is another partial cutaway perspective view of the spring mechanism of FIG. 2A.

A spring 70 may be wound around an outside surface 73 of the center tube 10. The spring 70 may be configured in a helical shape with a plurality of coils extending around the surface 73 of the tube 10. At each end of the spring 70, the last coil may be provided with an upward extending portion 76, 79. As shown in FIG. 2B, the upward extending portions 76, 79 are configured such that rotation of the handle 49 in a first direction causes the projecting member 67 to engage with a spring cam 110 that provides force to upward extending portion 79 to tighten the spring 70 around the tube 10. Rotation of the handle in a second direction, which is opposite the first direction, causes the projecting member 67 to engage with spring cam 110 to provide force to the upward extending portion 76 to loosen the grip of the spring 70 around the tube 10. When the handle 49 is rotated to tighten the spring 70 around the tube 10, the handle 49 can be used to rotate the tube 10 to draw the shafts 19, 22 into the tube 10 or to rotate the tube 10 such that the shafts 19, 22 move out of each end of the tube 10 to loosen the connection.

Figure 3:
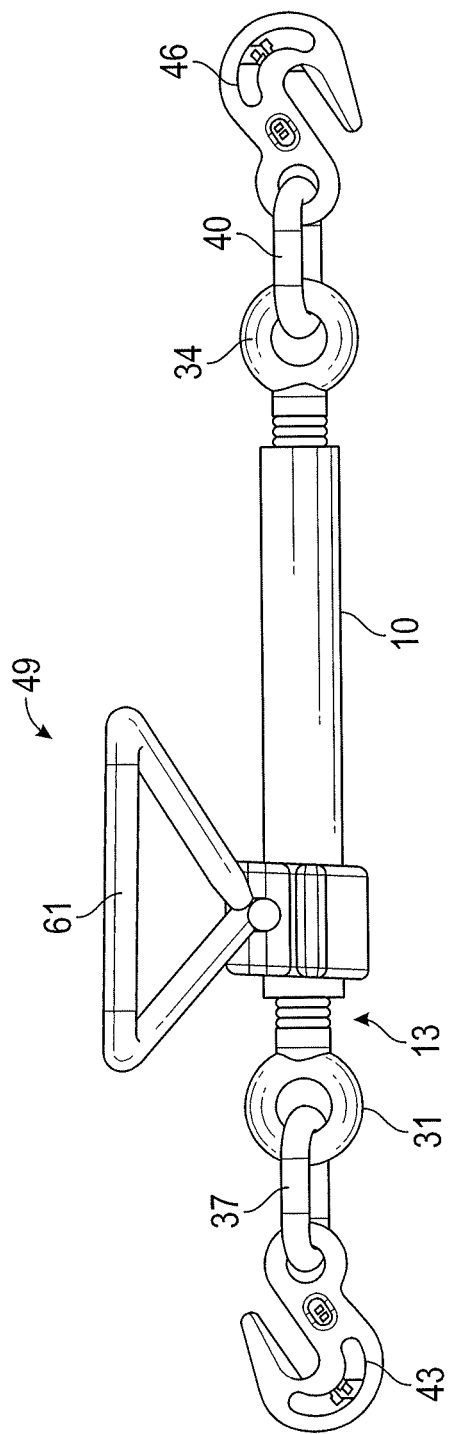
FIG. 3 is another perspective view of the ratchet binder of FIG. 1.

Turning to FIG. 3, when the handle 49 is rotated to loosen the grip of the spring 70 on the tube 10, the housing 52 and spring 70 can be slid over the tube 10 and easily moved to a different position along the length of the tube 10. In FIG. 3, the housing 52 is positioned toward the end 13 of the tube 10.

Figure 4:
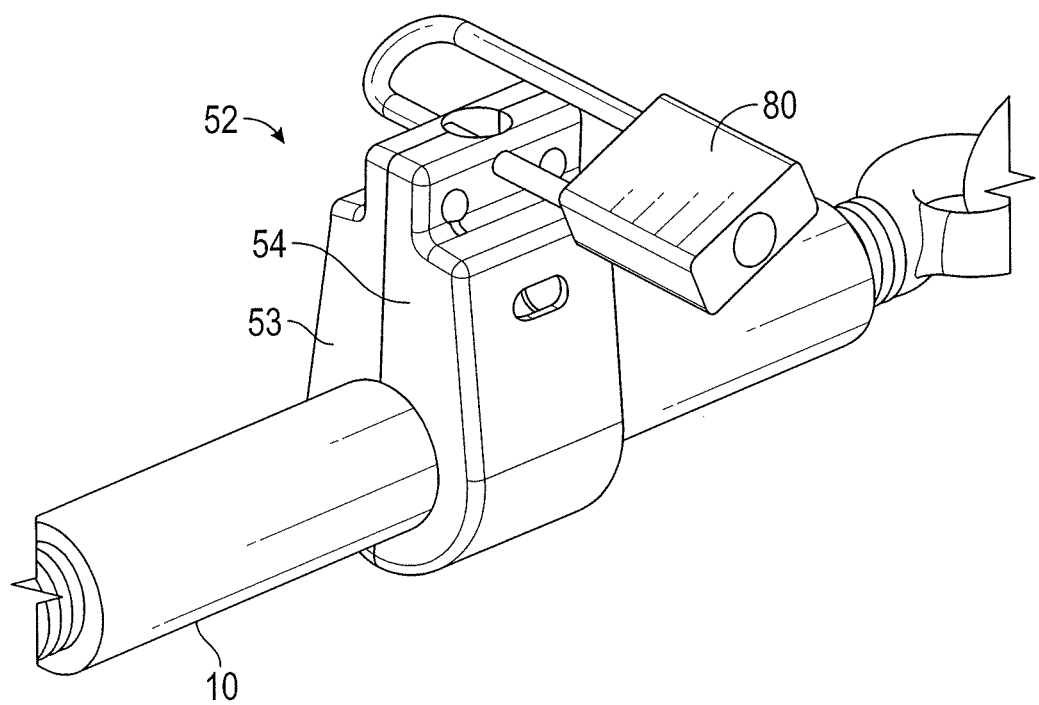
FIG. 4 is a perspective view illustrating a security feature of the present invention.

Turning to FIG. 4, the embodiment shown may be configured with a security device to provide for removing the handle 49 from the device and inserting a lock 80 that may be configured to obstruct a vertical opening in the housing 52 that receives the vertically extending portion 64 (FIG. 1) of the handle 49 (FIG. 1).

The present invention provides advantages over ratchets with gears. Ratchets with gears require a certain amount of handle movement to get from one tooth to the next tooth on the gear. The amount of this movement in the handle is directly related to the number of teeth on the gear. In some applications, there may not be sufficient space available to move the handle enough to reach another tooth on the gear to continue take up. A gearless ratchet according to the present invention does not require a set amount of handle movement to reach another gear tooth. Accordingly, the present invention is better able to operate in confined spaces.

The present invention contemplates that many changes and modifications may be made. Therefore, while the presently-preferred form of the gearless ratcheting binder has been shown and described, and several modifications and alternatives discussed, persons skilled in this art will readily appreciate that various additional changes and modifications may be made without departing from the spirit of the invention, as defined and differentiated by the following claims.

The invention claimed is:

1. A gearless binder comprising:
an internally threaded tube having opposing, open ends;
threaded shafts threadably inserted into the opposing open ends, the threads in the tube and the threads on the shafts adapted to provide common contraction and extension of the shafts relative to an interior of the tube with the shafts not turning and the tube turning,
a helical spring disposed around the outside of the tube;
wherein opposite ends of the spring are configured such that rotation of the one end in a first direction causes the spring to tighten around the tube and rotation of the other end in a second direction opposite the first direction causes the spring to loosen its grip on the tube.

2. The gearless binder of claim 1, further comprising a handle configured to rotatably engage with opposite ends of the spring such that rotation of the handle in a first rotational direction causes the spring to tighten around the tube and rotation of the handle in a second rotational direction opposite the first direction causes the spring to loosen its grip on the tube.

3. The gearless binder of claim 2, wherein the handle has a pair of angled members connected to a straight portion.

4. The gearless binder of claim 3, wherein the straight portion is configured to be received in a housing surrounding the spring.

5. The gearless binder of claim 4, wherein the straight portion is disposed substantially perpendicular to the tube when the housing is mounted on the tube.

6. The gearless binder of claim 5, wherein the housing has a first portion and a second portion removably attached to the first portion around the tube.

7. The gearless binder of claim 4, wherein the spring is configured such that rotation of one end of the spring enables the spring to release from the tube such that the spring can be slid over the tube in either direction along the length of the tube without removing the housing.

8. The gearless binder of claim 4, further comprising a lock configured to be attached to the housing to prevent attachment of the handle to the housing.

9. The gearless binder of claim 3, further comprising a projection extending from the straight portion, the projection configured such that rotation of the straight portion in a first direction causes the projection to engage with a spring cam configured to provide a force to a first end of the spring and rotation of the straight portion in a second direction opposite the first direction causes the projection to engage with the spring cam to provide a force to a second end of the spring disposed opposite from the first end of the spring.

10. The gearless binder of claim 1, wherein the threaded shaft has an eyelet disposed at an end.

11. A gearless binder comprising:
an internally threaded tube having opposing, open ends;
threaded shafts threadably inserted into the opposing open ends and the threads in the tube and on the shafts adapted to provide common contraction and extension of the shafts relative to an interior of the tube with the shafts not turning and the tube turning;
a helical spring disposed around the outside of the tube;
a handle configured to rotatably engage with opposite ends of the spring such that rotation of the handle in a first direction causes the spring to tighten around the tube and rotation of the handle in a second direction opposite from the first direction causes the spring to loosen its grip on the tube such that the spring can be moved into a new location along the length of the tube; and,
a housing mounted around the tube and enclosing the spring and a portion of the handle.

12. The gearless binder of claim 11, wherein the handle has a pair of angled members connected to a straight portion.

13. The gearless binder of claim 12, wherein the straight portion is disposed substantially perpendicular to the tube when the housing is mounted on the tube.

14. The gearless binder of claim 12, wherein the housing has a first portion and a second portion removably attached to the first portion around the tube.

15. The gearless binder of claim 12, further comprising a projection extending from the straight portion, the projection configured such that rotation of the straight portion in a first direction causes the projection to engage with a spring cam configured to provide a force to a first end of the spring and rotation of the straight portion in a second direction opposite the first direction causes the projection to engage with the spring cam to provide a force to a second end of the spring disposed opposite from the first end of the spring.

16. The gearless binder of claim 15, further comprising a lock configured to be attached to the housing to prevent attachment of the handle to the housing.

17. The gearless binder of claim 11, wherein the threaded shaft has an eyelet disposed at an end.

18. A gearless binder comprising:
an internally threaded tube having opposing, open ends;
threaded shafts threadably inserted into the opposing open ends and the threads in the tube and on the shafts adapted to provide common contraction and extension of the shafts relative to an interior of the tube with the shafts not turning and the tube turning;
a helical spring disposed around the outside of the tube, the helical spring having a first end and a second end disposed opposite the first end; and,
means for rotating the first end of the spring in a first direction to wrap the spring tighter around the tube and means for rotating the second end of the spring in a second direction to unwrap the spring from the tube.

* * * * *